United States Patent [19]

Stanley

[11] Patent Number: 5,370,012

[45] Date of Patent: Dec. 6, 1994

[54] LINEAR ACTUATION ROLLER BEARING NUT

[76] Inventor: Richard B. Stanley, P.O. Box 6584, Lincoln, Nebr. 68506

[21] Appl. No.: 27,340

[22] Filed: Mar. 8, 1993

[51] Int. Cl.$^5$ .............................................. F16H 1/18
[52] U.S. Cl. ................... 74/89.15; 74/424.86; 74/459
[58] Field of Search ....... 74/89/15, 424.8 R, 424.8 C, 74/459

[56] References Cited

U.S. PATENT DOCUMENTS

| | | | |
|---|---|---|---|
| 3,003,362 | 10/1961 | Martens | 74/459 X |
| 3,004,445 | 10/1961 | Mondon | 74/459 |
| 3,128,634 | 4/1964 | Eastman | 74/424.8 |
| 3,572,136 | 3/1971 | Stanley | 74/25 |
| 3,589,202 | 6/1971 | Stanley | 74/25 |
| 3,861,221 | 1/1975 | Stanley | 74/25 |
| 3,861,226 | 1/1975 | Stanley | 74/89.15 |
| 3,884,090 | 5/1975 | Dock | 74/424.8 C |
| 3,965,761 | 6/1976 | Stanley | 74/89.15 |
| 4,033,194 | 7/1977 | Stanley | 74/89.15 |
| 4,050,319 | 9/1977 | Stanley | 74/89.15 |
| 4,884,466 | 12/1989 | Duruisseau | 74/459 X |

FOREIGN PATENT DOCUMENTS 4115756 11/1992 Germany ........................... 74/459

*Primary Examiner*—David W. Laub
*Attorney, Agent, or Firm*—John M. Mann

[57] ABSTRACT

A device for convening rotational motion of a threaded shaft to linear motion in parallelism with the shaft and having a high load carrying capacity and operating efficiencies that are on the order of 98 percent (98%), with the device including a roller bearing nut for the shaft that is arranged to provide a linear motion unit (for the device) and a housing annular structure arranged to be fixed from rotation and including a plurality of circularly and concavely shaped thrust teeth of essentially "V" configuration 360 degrees (360°) thereabout, of which such thrust teeth are of identical size and configuration and are disposed in coaxial side-by-side relation normally of the desired direction of linear motion and at a formula defined pitch that also exceeds the pitch of the shaft threading; cooperating between the shaft threading and the thrust teeth are a set of thrust rollers seated about the linear motion unit in uniformly spaced relation, with each thrust roller having two (and only two) spaced pairs of similar flanges each riding on both the shaft threading and one of the thrust teeth of the housing, with the spacing of such flanges of each such thrust roller being similar and formula defined, and with each thrust roller pair riding on only certain of the opposing thrust teeth, though the rest of such teeth are similarly engaged by the flange pairs of the other thrust rollers involved.

13 Claims, 6 Drawing Sheets

LINEAR ACTUATION ROLLER BEARING NUT

This invention relates to a device for converting rotary motion to linear motion, with both high force conversion ratios and high efficiency, and more particularly, the invention relates to a device in the nature of a roller beating nut for converting rotary motion to linear motion of the general type disclosed in my U.S. Pat. Nos. 3,861,226, 3,965,761, and 4,050,319, in which the motion conversion is achieved by the device parts involved operating only with rolling friction.

Existing mechanical devices presently in general use for converting rotary motion to linear motion fall into one of three basic groups, namely screw and nut devices, which provide reasonable force conversion ratios at low efficiency; ball and nut devices, which provide high efficiency, but with low force conversion ratios; and, rack and gear devices which provide low force conversion ratios and low efficiency. Prior to the Applicant's inventions, them was no known mechanical method, insofar as the Applicant is aware, for converting rotary motion to linear motion with both high force conversion ratios and high efficiency.

A principal object of the present invention is to provide a device for converting rotary motion (such as may be provided by an electric motor) to linear motion, and, having a high load carrying capacity that involves only rolling friction in the motion conversion that is provided, so that the linear actuator device involved truly operates at efficiencies on the order of 98 percent (98%).

Another principal object of the invention is to provide a motion translating bearing unit for use with threaded shafts to convert rotary motion to linear motion that is comparable in size and simplicity to the ordinary conventional ball bearing units commonly employed for shaft journalling purposes, but which unit is arranged for ready mounting and securement to parts to be moved linearly on rotation of the threaded shaft.

Another important object of the invention is to provide a rolling bearing device or unit of the motion translating type employing free rolling unjournalled flanged thrust rollers and in special pitch relationships between the threading of the rotating shaft and the linear motion providing component of the unit involved.

Other objects of the invention are to provide a linear actuator bearing arrangement that operates at efficiencies on the order of 98 percent (98%) at a cost that is a fraction of the cost of conventional devices of this type, to provide a linear actuator arrangement that is internally self-aligning, and to provide a linear actuator arrangement that is economical of manufacture, convenient to install and use, susceptible of a wide variety of applications, light in weight, small in size, and susceptible of a wide variety of applications for use purposes.

In accordance with the present invention, a linear actuator arrangement of the rotatable threaded shaft type is provided which is concerned with a simplified bearing unit arranged for ready connection to the member to be moved linearly, as well as ready operable association with the shaft. The rotatable threaded shaft, which preferably may be rotated in either direction utilizing, for instance, electric energy which is provided by (the familiar electric motor), comprises the usual shaft member that is threaded with a single essentially V-type threading of the 90 degree (90°) variety. Associated with the threaded shaft and applicable thereabout is the linear actuated component of the invention that is suitably fixed against rotation and keyed to the device housing, and includes a set of circular concavely shaped thrust teeth that each has the same "V" configuration that the rotating shaft threading has which teeth are of identical size and configuration and are disposed in coaxial side-by-side relation so as to be positioned normally of the desired direction of linear motion; such teeth have a pitch that exceeds the pitch of the shaft threading in accordance with this invention, and a set of thrust rollers, each having several spaced pairs of similar V-shaped flanges that are planar in configuration but have the same essentially V-type shaping as the rotating shaft threading and the said thrust teeth, which thrust rollers are interposed between the shaft threading and the respective individual teeth of the linear actuated component, with each pair of flanges of such thrust rollers riding on either side of the shaft threading as well as selected ones of the respective teeth involved in such linear actuated component and with all of said toothings being separately engaged by said flange pairs. It is essential that the linear actuator component teeth have a pitch in accordance with the formula: pitch of the shaft threading plus the quotient of the shaft threading pitch divided by the number of thrust rollers employed, and that on each thrust roller the pairs of such thrust roller flanges of each such roller be spaced from the other such set of flanges thereof a distance in accordance with the formula: the number of thrust rollers employed plus one times the pitch of the shaft threading; it is assumed, of course, that the same standard of measurement is involved that provides the factors for each such formula.

In a preferred embodiment, spacer rollers are employed to separate the aforementioned thrust rollers, with the shaft threading being flattened throughout the length thereof, said roller flanges having edge flattening that is similar to that of the shaft threading, and such spacer rollers being respectively interposed in full confinement between the respective thrust rollers about the shaft and riding on the flanges of adjacent thrust rollers (of said set of thrust rollers), in such a manner that such spacer rollers do not engage either the threaded shaft or the teeth of such linear actuated component; such linear actuated component is preferably in the form of a series of stacked together individual washers, each shaped at its internal edging to define a separate linear actuated component tooth, which stack of washers is suitably fixed against rotational movement. Such spacer rollers ride on a retainer ring at either end of the resultant nut unit involved that may be applied to the shaft "nut" turn on fashion. The indicated spacer rollers at each end of same ride on said retainer rings that, as indicated, are disposed at the end of the resulting nut bearing involved, with said retainer rings rotating about the threaded shaft under the driving action of the separate spacer rollers that is passed on to them by the respective engagement of the same with the individual thrust rollers that they separate.

Alternately, the spacer rollers and the retainer rings therefor may be eliminated in favor of a pair of retainers at the respective ends of the respective thrust rollers that position such thrust rollers to respectively have the same tooth-shaft threading engagement that is referred to above.

Other objects, uses, and advantages will be obvious or become apparent from a consideration of the following detailed description and the application drawings in which like reference numerals indicate like parts throughout the several views.

IN THE DRAWING

Figure 1:
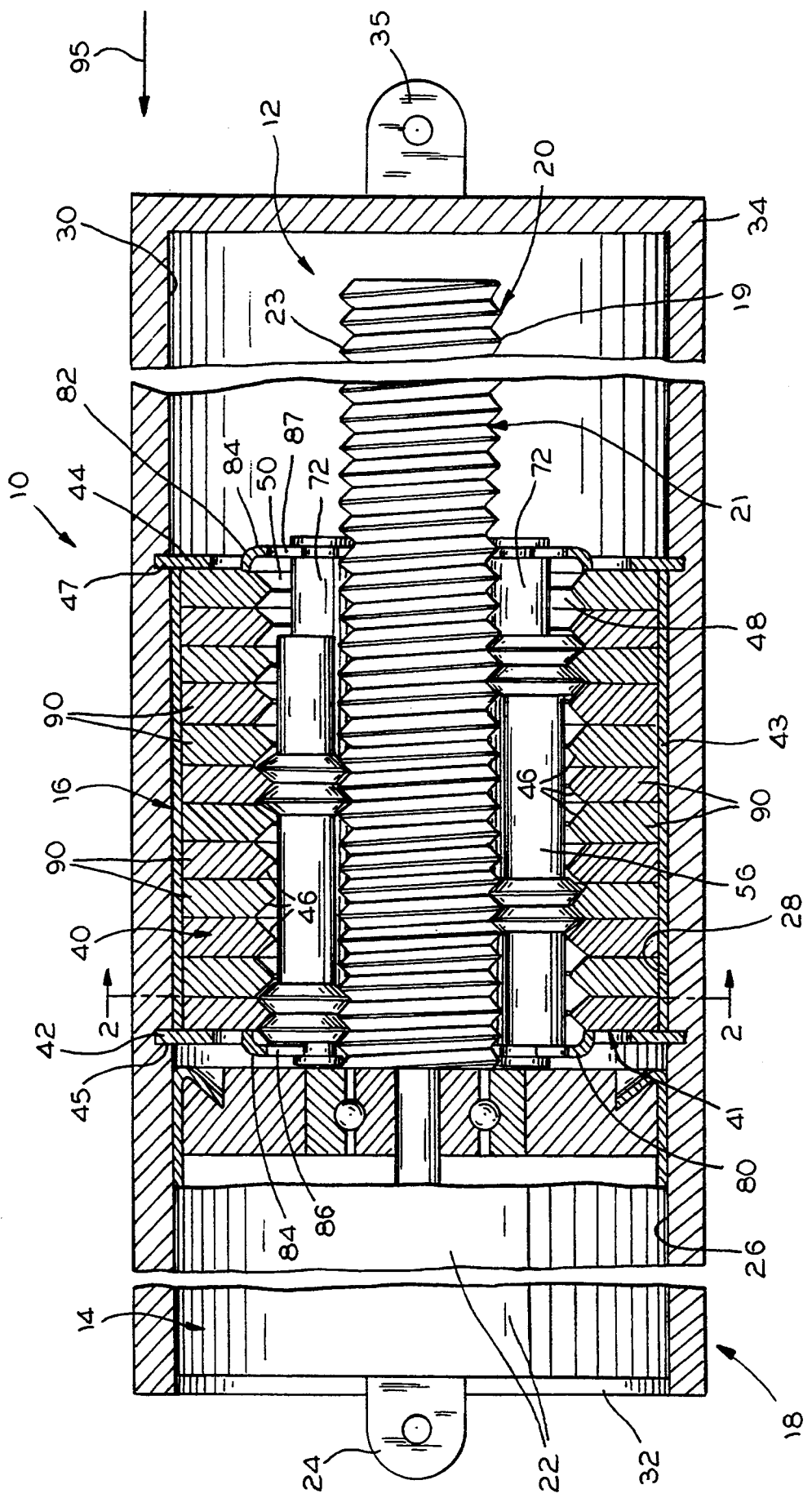
FIG. 1 is a longitudinal sectional view, partially in elevation, showing a specific linear actuator device of the present invention arranged for commercial application and embodying the principles of the present invention.
Figure 2:
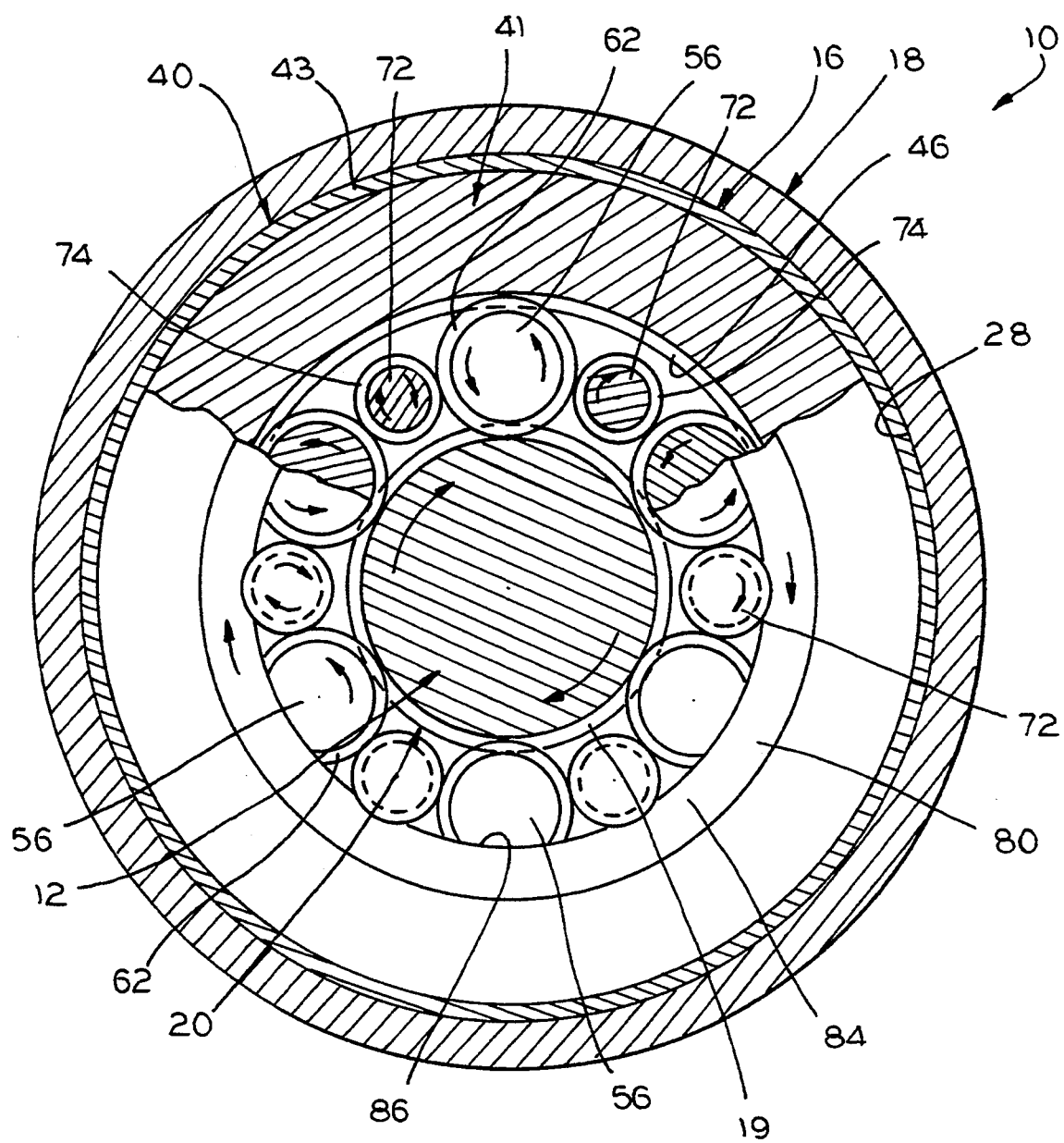
FIG. 2 is diagrammatic transverse cross sectional view taken substantially along line 2—2 of FIG. 1 (looking in the direction of the arrows), and through the roller bearing nut involved, but on an enlarged scale and with parts broken away, and illustrating the preferred embodiment of the roller bearing nut of the present invention, as applied to the linear actuator shown in FIG. 1.
Figure 3:
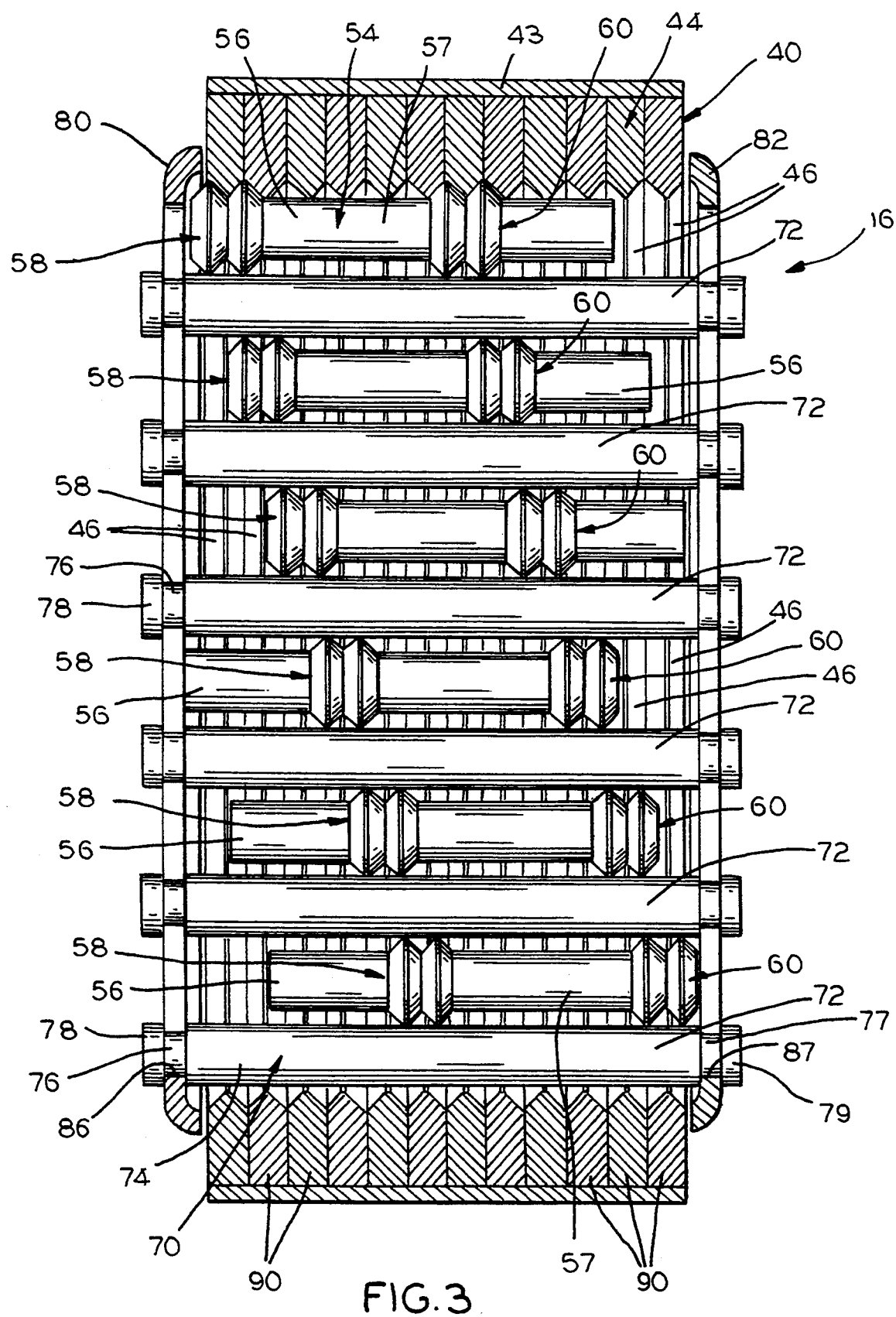
Figure 4:
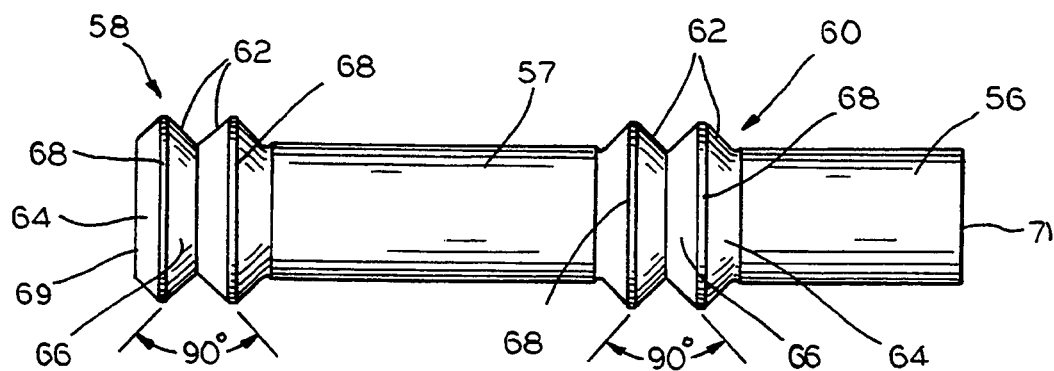
Figure 5:
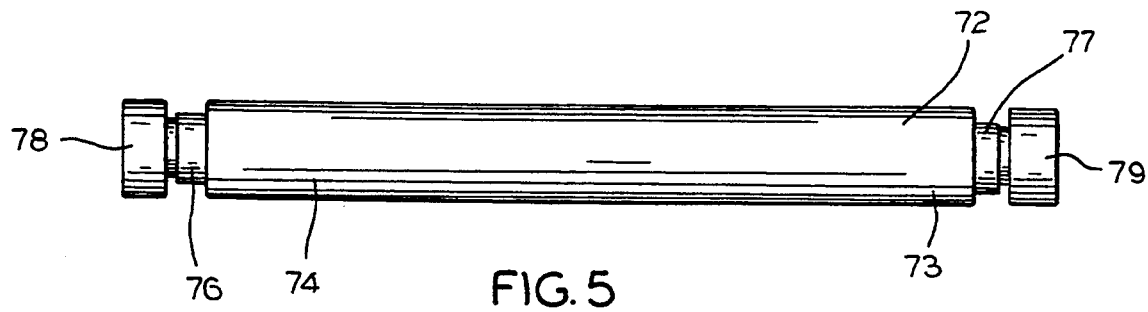
Figures 6, 7:
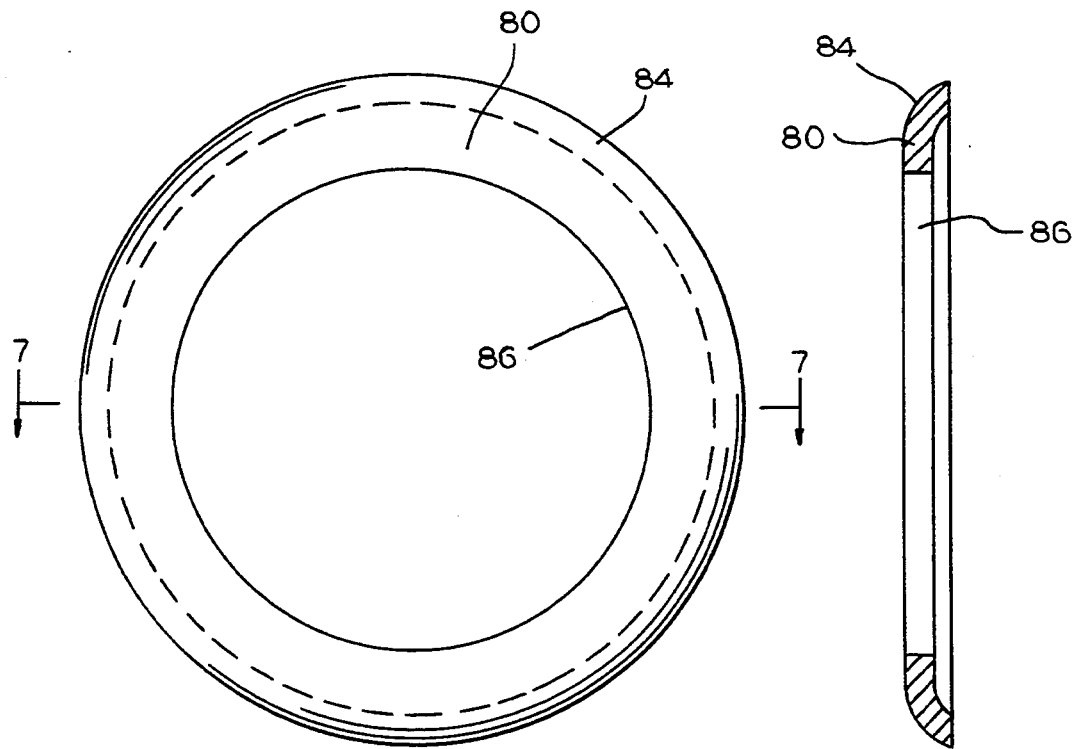
Figure 8:
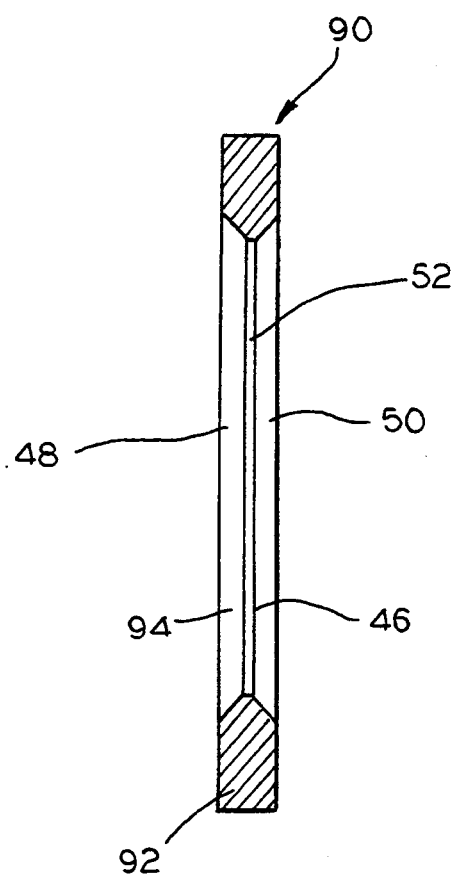
Figure 9:
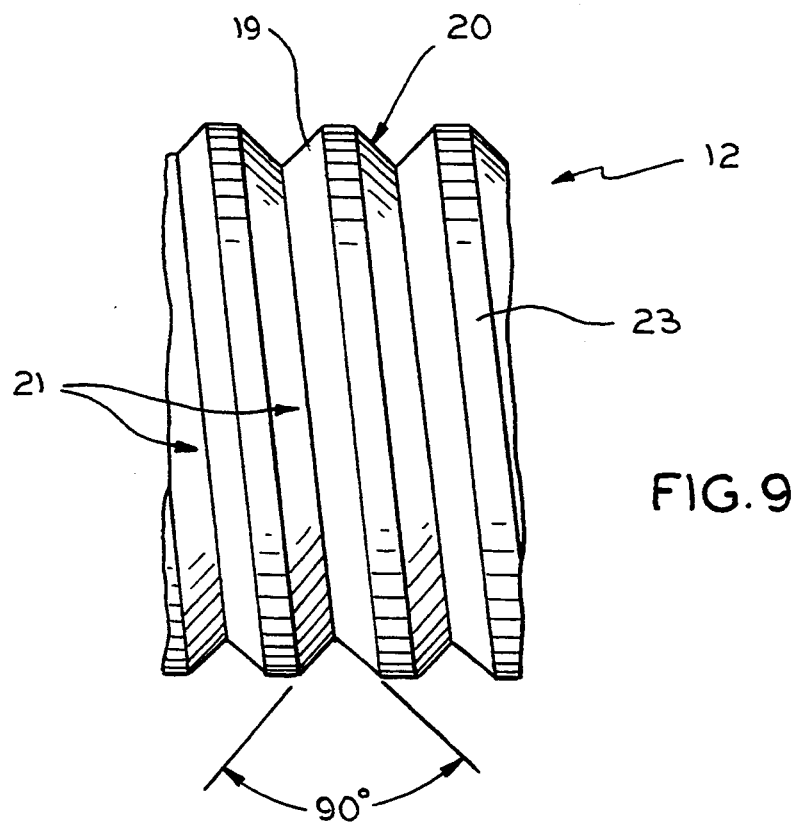
Figure 10:
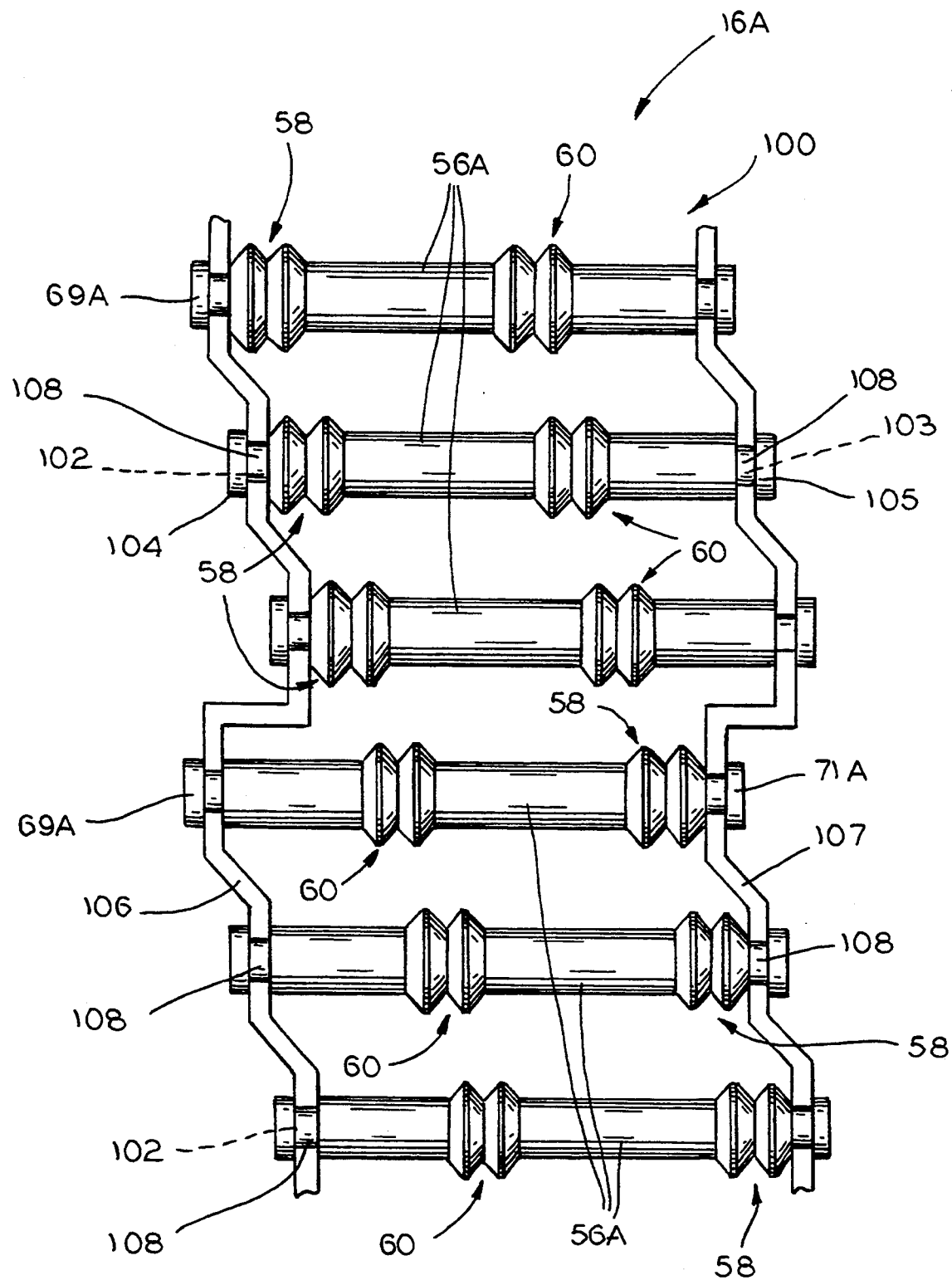

FIG. 3 is essentially a diagrammatic longitudinal sectional view of the preferred roller bearing nut arrangement of this invention, taken substantially along the axial center of the linear actuator shown in FIG. 1, with the sectional view being "laid out" flat, and the threaded shaft omitted, to diagrammatically illustrate all of the other roller bearing nut components involved, and indicate the cooperation between the various parts illustrated;

FIG. 4 is a plan view on an enlarged scale of the preferred form of thrust roller configuration, which in accordance with the preferred embodiment of the invention shown in FIG. 1, is the same for all six (6) thrust rollers involved (compare FIGS. 2–4);

FIG. 5 is an enlarged plan view of one of the spacer rollers employed in the preferred embodiment of the invention shown in FIGS. 1-3, with the spacer roller configuration illustrated being employed for all of the spacer rollers of this embodiment of the invention;

FIG. 6 is an enlarged elevational view of the exterior of one of the spacer roller retainers in accordance with the preferred embodiment of the invention;

FIG. 7 is a view of the retainer ring of FIG. 6, taken substantially along the line 7—7 of FIG. 6;

FIG. 8 is a transverse sectional view of one of the linear motion unit washers of the embodiment of FIGS. 1 through 3, taken substantially along the center line of same that in the mounted position of same would coincide with the longitudinal center line of the linear actuated device shown in FIG. 1;

FIG. 9 is a side elevational view of a fragment of the threaded shaft involved in the arrangement of FIGS. 1 ,through 3, but on an enlarged scale to better illustrate the nature of the special threading with which such shaft is formed; and FIG. 10 is a diagrammatic plan view of the general type employed for FIG. 3, illustrating yet another embodiment of the invention that eliminates the spacer rollers and retainer rings of the preferred form of the invention shown in FIGS. 1 through 3, and substitutes therefore thrust roller holder rings at either end of the indicated thrust rollers that are shaped to dispose the thrust rollers involved in their same positions that are shown in FIG. 3.

However, it is to be distinctly understood that the drawing illustrations referred to are provided primarily to comply with the disclosure requirements of the Patent Laws, and that the invention is susceptible of modifications and variations that will be obvious to those skilled in the art, and that are intended to be covered by the appended claims.

GENERAL DESCRIPTION

Reference numeral 10 of FIGS. 1 through 3 generally indicates a linear actuator device arranged in accordance with the present invention, which comprises a threaded shaft 12 rotated by a suitable electric motor 14, a roller bearing unit 16 operably associated with the threaded shaft 12 and arranged to convert rotary motion to linear motion and a tubular member 18 to which the bearing unit 16 is anchored or secured for moving the tubular member 18 longitudinally of the axis of the threaded shaft 12 on operation of motor 14.

The shaft 12 is provided with external threading 20 that is specifically illustrated in the showing of FIG. 9, in which the threading 20 comprises a single thread 19 of the single thread number variety, that is defined by suitable V-shaped grooving 21 that is spiraled in any suitable manner, with the edging of the threading 20 being resulting convex to define the flattened spiral surfacing 23. The shaft 12 is suitably connected to the driving components of motor 14 (not shown, but motor 14 may be one of the common electrical or fluid driven types), which driving components are housed in a suitable motor housing 22 that in the form illustrated includes suitable bracket 24 adapted for securement to one of the structures that the actuator 10 is to be secured between.

The tubular member 18 in the form shown defines a bore portion 26 that receives the motor 14, a bore portion 28 in which the roller bearing nut 16 is applied, and a bore portion 30 into which the threaded shaft 12 extends in the contracted relation of the device 10. Tubular member 18 in this specific form shown has a open end 32 from which the motor 14 is exposed as the device 10 is operated to move toward its extended relation, and a closed end 34 provided with a suitable attachment bracket 35 that is adapted for securement to the other component that the actuator 10 is to be secured to for providing the usual linear actuator purposes.

The roller beating unit 16 of FIGS. 1 through 9 is arranged to include linear actuated component 40 that is to be associated with tubular member 18 in its bore portion 28 in which the bearing unit 16 is applied, the linear actuated component 40 comprising in the form illustrated a body 41 received in a close fitting manner within sleeve 43, with the sleeve 43 and body 41 being keyed to the tubular member 18 by the suitable lock rings 42 and 44 that are respectively received in the usual manner in suitable lock ring receiving recesses 45 and 47 of the tubular member 18.

In accordance with the preferred embodiment of the invention, the body 41 is suitably formed to define a set of circular concavely shaped thrust teeth 46 of the "V" configuration having the same angulation and same edge flattening as the shaft threading (see FIG. 8) including the angled circularly concave surfaces 48 and 50 and the circularly formed edging surface 52 of same). Such teeth 46 are of identical size and circular configuration, and are disposed in coaxial side-by-side relation, so as to be disposed normally of the desired direction of linear motion for the device 10; as has been already indicated, the teeth 46 have a pitch that exceeds the pitch of the shaft threading in accordance with the invention, with the pitch of the teeth 46 (that is their spacing) exceeding the corresponding pitch of the shaft threading 19, as more specifically disclosed hereinafter.

Roller bearing 16 also includes a set 54 (see FIG. 3) of thrust rollers 56, with each of the thrust rollers 56 being formed to integrally define a shank 57 and spaced pairs 58 and 60 (See FIG. 4) of flange structures in the form of planar flanges that, as indicated by FIG. 4, are of the same angulation and edge flattening as the shaft 12 and the thrust teeth 46; specifically, each such pair of flanges comprises two single flanges 62 that each have angled side surfaces 64 and 66 and edging surfacing 68 that are comparable to the corresponding surfacings of the shaft 12 and the teeth 46 with which they cooperate as indicated in FIGS. 2 and 3; thus, each flange pair 58 and 60 of the individual thrust rollers 56 ride on either side of the shaft threading 19 as well as side surfacings 48 and 50 of each tooth 46 (see FIG. 8) involved in the linear actuated component 40, with such set 54 of thrust rollers 56 in accordance with the preferred embodiment of the invention being six in number, being all similarly shaped, having planar opposite ends 69 and 71, and being disposed as indicated in FIG. 3 so that their respective pairs of flanges 58 and 60 engage separately selected individual teeth 46 (that have been described), with the individual thrust rollers 56 being disposed in the bearing 16 so that all of the teeth 46 are separately engaged by the respective pairs of roller flanges 58 and 60 of consecutive rollers 56 (see FIG. 3).

A critical feature of the present invention is that the linear actuated component teeth 46 have a pitch in accordance with the formula: pitch of the shaft threading 19 plus the quotient of the pitch of the shaft threading 19 divided by the number of thrust rollers 56 employed (to form a bearing 10); further, the pair of flanges 58 and 60 on each thrust roller 56 are to be spaced apart a distance in accordance with the formula: the number of thrust rollers 56 employed to form a bearing 10 plus one, times the pitch of the shaft threading 19 (assuming, as already indicated, that the same standard of measurement is involved that provides the factors for such formulae).

In the preferred embodiment of the invention that is shown in FIGS. 1 through 3, the bearing unit 16 includes a set 70 of separator for spacer rollers 72 (see, for instance, FIGS. 3 and 5), all of which have the configuration indicated in FIG. 5 to define a roller body 73 forming a roller portion or shank 74, which has at either end of same reduced diameter tiding surfaces 76 and 77, and separator roller body end portions 78 and 79. In use, the separator rollers 72 are interposed in full confinement relation, and thus are disposed between, adjacent thrust rollers 56, with the shank 74 of the respective spacer rollers 72 tiding on the flanges 62 of the respective thrust rollers 56, and being spaced from the shaft threading 19 and the respective linear actuated component teeth 46, in the manner indicated in FIG. 2. The separator rollers 72 are disposed transversely of the roller bearing 16 (see FIG. 3) and operably associated with retainer tings 80 and 82 (see FIGS. 1, 6 and 7) at either end of same (see FIG. 1), so as to dispose the separator or spacer roller respective riding surfaces 76 and 77 in riding engagement with the respective raceways 86 and 87 (see FIG 1) of the respective retainer tings 80 and 82. As indicated in FIGS. 1, 6 and 7, these retainer rings 80 and 82 each define a rim 84 (see FIGS. 6 and 7) in which the respective raceways 86 and 87 are formed; as indicated in FIG. 6, the shaping of these raceways is circular. Further, in accordance with the preferred embodiment of the invention, the linear actuated component 40 is in the form of a stack of individual washers 90 that are of the same shape and size to define the respective teeth 46, the individual washers 90 each thus comprising a body 92 (see FIG. 8) defining an inner rim 94 that is shaped to form the respective teeth 46 (note the showing of FIG. 8, and specifically the surfaces 48 and 50 thereof as well as the edging surface 52 that have already been mentioned).

On rotation of the shaft 12 by the motor 14 to rotate in the direction indicated by the arrows of FIG. 2, these thrust rollers 56 and the separator rollers 72 rotate in the respective directions indicated by the arrows of FIG. 2, with the separator rollers 72 riding on the respective edging surfaces 68 of the respective thrust roller flanges 58 and 60, and the respective separator rollers 72 also riding on the respective circular raceways 86 and 87 of the respective retainer tings 80 and 82 to rotate such retainer rings in the direction indicated by the corresponding arrows of the retainer ring 80 that is shown in FIG. 2.

The thrust rollers 56 that ride on the shaft threading 19, individually apply linear thrust to the linear actuated component member teeth 46 through their flanges 58 and 60 (see FIG. 3), the direction of which will depend on the direction of rotation of the shaft 12.

Since the linear actuator device 10 is shown in its fully retracted relation in the showing of FIG. 1, it is assumed that the direction of rotation of the shaft 12 will be such that the linear actuated component 40 in the tubular member 18 to which it is keyed is moved to the fight of FIG. 1 to extend the device 10 (see arrow 95), and rotation in the opposite direction will move tubular member 18 to the left of FIG. 1 to contract same, again assuming that the bracket 24 is secured to a stationary component and the bracket 35 is secured to the component to be moved linearly.

The pitch of the shaft threading 19 may be in the amount desired to achieve the force conversion characteristics that are desired for a particular unit 10, with the pitch of the teeth 46 being greater than the pitch of the shaft 12 threading 19 in accordance with the present invention.

The showing of FIG. 10 is concerned with a modified embodiment of the invention in which a modified roller bearing 16A employs the thrust roller arrangement 100 and eliminates the spacer rollers 72 and their associated retainer tings 80 and 82.

The embodiment of FIG. 10 is otherwise the same as the embodiment shown in FIGS. 1 through 9.

In the embodiment of FIG. 10, the individual thrust rollers 56A are basically the same as the respective rollers 56, and are positioned in a manner indicated in FIG. 3 within the modified roller bearing 16A, although at their respective ends 69A and 71A, they are formed with respective riding surfaces 102 and 103 at the respective shank end portions 104 and 105. Associated with the respective thrust rollers 56 at each end of same, at the respective tiding surfaces 102 and 103, are similar retainer tings 106 and 107 that define journalling portions 108 in which the respective roller shank end portions 104 and 105 are respectively journalled, for circular movement of the respective retainer rings 106 and 107 simultaneously in orbit about the roller beating 16A under the driving action that is imposed on the modified thrust rollers 56A by the rotation of shaft 12 and its thread 19.

It will be apparent that the respective retainer tings 106 and 107 have to be shaped in the manner that is indicated in the showing of FIG. 10 in order to dispose the respective thrust rollers 56A in the necessary positions indicated by the showing of FIG. 3 for the thrust rollers 56.

It will be seen that the complicated nature of the resulting roller bearing embodiment 16A would make such roller beatings more expensive than the beating 16, and the shaping of the retainer rings 106 and 107 that is necessary further adds to production expense as well as to friction loss occasioned by the necessary journalling of the rollers 56A in the respective retainer rings 106 and 107.

Some specific aspects of this development are pointed out as follows:

It is apparent to Applicant that no prior art linear actuator device is arranged so that the pitch of the linearly moveable element thereof is different from the threaded screw pitch involved.

As is clear from the showing of FIGS. 3, 4, and 9, the thrust rollers 56 by way of their respective pairs of flanges 58 and 60 have two physical contacts with the rotating screw (where such thrust rollers ride on the screw threading 19), while each such thrust roller has a single physical contact with body 41 in the direction of movement (fore or aft) involved (in this connection, it is to be noted that the thrust surfaces of the respective pairs of flanges 58 and 60 act against only one side of an individual linear actuated component tooth 46 in providing the fore or aft motion referred to).

It will also be apparent from the showing of FIG. 3 that each set of flanges 58 or 60 of the respective thrust rollers 56 is to be seated on its own tooth 46 of body 41, and thus its own washer 90 in the preferred embodiment.

As already has been indicated, each pair of thrust roller flanges 58 and 60 is separated from the other pair of same on the respective thrust rollers 56 in accordance with the formula: the number of thrust rollers employed in the roller bearing involved plus one times the pitch of the screw threading 19.

Furthermore, the teeth 46 have a pitch according to the formula: pitch of the screw threading 19 plus the quotient of the pitch of the threading 19 divided by the number of thrust rollers employed in the particular roller bearing in question.

It is pointed out, also that the sleeve 43 is an optional item, since the linear actuated component 40, and in particular the respective washers 90, can be made of sufficient external diameter to take the place of the indicated sleeve 43, or alternately, the housing member 18 may be of the internal diameter necessary to accommodate the external diameter of the linear actuated component 40 in close fitting relation thereto.

In the preferred embodiment of the invention, employing a stack of washers 90 to provide the linear actuated component 40, lowers cost of manufacture and assembly of the device, changing the processing involved from an internal finishing operation to a stamping operation.

As indicated, it is preferable that the thrust rollers 56 all be identical and their positions appropriately changed, (see FIG. 3), in order to provide the necessary thrust roller contact positions with regard to all teeth 46 of the linear actuated component 40.

It is also pointed out that the separator rollers 72 are, in effect, needle bearings having the function of separating adjacent thrust rollers 56 from each other, as herein disclosed. In this connection, where the rollers 72 are employed, it is important that they are positioned so as not to touch the screw member 12 involved or the teeth 46; this assures that all rollers 56 and 72 involved (12 in the preferred embodiment) roll correctly (see FIG. 2) with respect to each other.

In the preferred embodiment of the invention, the thrust rollers 56 and the separator rollers 72 stay in place from moving toward the axial center indicated by FIG. 2 by "full confinement" geometry, and they also cannot move longitudinally thereof because of the retention of same by the retainer tings 80 and 82 (that rotate as indicated when linear actuation is effected).

Prior to the application of the roller bearing 16 to a housing 18 to form a linear actuator 10, the retainer tings 80 and 82 as applied to the respective separator rollers 72 hold the component parts of the roller bearing 16 in operating position.

The assembled roller bearing forms a complete unit by itself which may be applied to threaded shaft 12 having a threading 19 by rotating same with respect to the shaft as one would a nut.

The linear actuator device disclosed herein and shown in FIGS. 1-9 operates only with rolling friction, and thus operates with an efficiency of approximately 98 percent (98%).

The foregoing description and the drawings are given merely to explain and illustrate the invention, and the invention is not to be limited thereto, except insofar as the appended claims are so limited, since those skilled in the art who have this disclosure before them will be able to make modifications and variations therein, without departing from the scope of the invention.

I claim:

1. A linear actuator comprising:
a shaft member having a central axis extending longitudinally thereof and a continuous external threading formed therealong that defines thrust surfacings on either side of same that are disposed in a threading manner about said central axis of said shaft member,
a tubular member disposed in concentric relation about said shaft member and defining a central axis that is disposed coaxially of said central axis of said shaft member,
said tubular member defining annular toothing that is disposed about said shaft member in concentric relation thereto,
with said toothing comprising a plurality of annular thrust teeth of equal diameter and shaping formed about said central axis of said tubular member, with said thrust teeth being disposed in side-by-side relation lengthwise of said tubular member,
and with each of said toothing thrust teeth defining a continuous, circularly concave, thrust surfacing on either side of and about same,
and a plurality of free rolling thrust rollers extending longitudinally of said members and interposed between said shaft member and said tubular member toothing,
each of said thrust rollers including:
a central axis extending longitudinally thereof that parallels said central axis of said shaft member and said tubular member, and
at least one pair of adjacent flanges that are continuous thereabout, that lie in planes that are normal to said central axis thereof, and that define a set of said flanges,
said thrust roller flange set defining thrust surfacings proportioned to roll on, and be in rolling engagement with, certain ones of the respective said thrust surfacings of said shaft member, on relative movement of one of said members relative to the other of said members, with said pair of flanges of each of said thrust rollers being located on the respective thrust rollers to effect engagement of said thrust surfacings of such thrust rollers thereof with said certain ones of said thrust surfacings of separate ones of said teeth, with said teeth having a pitch that exceeds the pitch of said shaft member threading, and with said set of thrust flanges of each said thrust rollers by way of said thrust surfacings thereof having two physical contacts with said screw member threading and a single physical contact with said separate ones of said teeth for effecting the direction of movement involved in the actuation of said linear actuator.

2. The linear actuator set forth in claim 1, wherein: each of said thrust rollers includes a second set of said continuous flanges spaced from said first set of same a distance in accordance with the formula: the number of said thrust rollers plus one multiplied by the pitch of said shaft member threading, and with each of said thrust flanges of said second set of said thrust flanges being located on the respective said thrust rollers to effect engagement thereof with said thrust surfacings of all other separate ones of said teeth, respectively, and provide said two physical contacts with said screw member threading for each said physical contact that said thrust roller second set of said flanges have with said toothing for any one direction of movement involved in the actuation of said linear actuator.

3. The linear actuator set forth in claim 1 wherein said toothing pitch is in accordance with the formula: the pitch of said shaft member threading plus the quotient of the pitch of said shaft member threading divided by the number of said thrust rollers that are interposed between said shaft member and said tubular member toothing.

4. A linear actuator comprising:

a shaft member having a single threading in accordance with a predetermined pitch;

a tubular component in substantial concentric relation to said shaft member and defining a set of spaced annular toothings, with said toothings having a pitch that is different from that of said shaft member;

a plurality of free rolling thrust rollers interposed between said shaft member and said toothings about said shaft member, with all of said rollers including at least one thrust flange structure riding on said shaft threading;

and with each of said roller flange structures also riding on selected ones of said toothings and with all of said toothings being separately engaged by, and riding on respective of said roller flange structures;

said roller flange structures in number being equivalent to the number of said toothings, and including:

spacer rollers that are respectively interposed between and riding on the respective said thrust roller flange structures about said shaft member;

said spacer rollers being in full confinement relation;

and including retainer rings adjacent each end of said toothing set with said spacer rollers being in rolling relation to said retainer rings.

5. The linear actuator set forth in claim 4, wherein: said riding of said thrust flange structures and said spacer rollers is only of the rolling friction type.

6. The linear actuator set forth in claim 5, wherein: said flange structure of said thrust rollers for each of said thrust rollers comprises a pair of such flange structures shaped for mating engagement with said shaft threading and said toothings, respectively;

with said toothings having a pitch equivalent to the pitch of said shaft threading plus the quotient of the pitch of said shaft threading divided by the number of said thrust rollers.

7. The linear actuator set forth in claim 6, wherein: said pair of flange structures of each of said thrust rollers are spaced apart a distance equal to the number of said thrust rollers plus one multiplied by the pitch of said shaft threading.

8. In a linear actuator of the type including a shaft member, a tubular member in substantially concentric telescoping relation to said shaft member; a bearing unit interposed between said members; means for rotating one of said members: and means for holding the other of said members against rotation while permitting linear movement thereof;

the improvement wherein:

said shaft member is threaded longitudinally thereof;

and wherein said unit comprises:

the tubular member that is in substantial concentric telescopic relation to the shaft member about the bearing unit defines spaced annular toothings having a pitch that exceeds that of said shaft member threading;

a plurality of free rolling thrust rollers that are disposed between said shaft member and said toothings and about said shaft member;

with all said thrust rollers including several thrust flange structures each in the form of thrust flange sets having at least one thrust flange thereof tiding on said shaft threading;

and with each of said roller thrust flanges riding on selected ones of said toothings;

said roller thrust flange structures in number being equivalent to the number of said toothings, and all of said toothings being separately engaged by said thrust roller flanges, and including:

spacer rollers that are respectively interposed between and riding on said thrust rollers flange structures about said shaft;

said spacer rollers being in full confinement relation; and including retainer rings adjacent each end of said spacer rollers with said spacer rollers being in rolling relation to said retainer rings.

9. The improvement set forth in claim 8, wherein: said riding of said thrust and spacer rollers is only of the rolling friction type.

10. The improvement set forth in claim 8, wherein: said flange structures of said thrust rollers for each of said thrust rollers comprises a pair of such flanges shaped for mating engagement with said shaft threading and said toothing, respectively, with said toothings having a pitch equivalent to the pitch of said shaft threading plus the quotient of the pitch of said shaft threading divided by the number of said thrust rollers.

11. The improvement set forth in claim 10, wherein: said pairs of thrust flanges of each of said thrust rollers being spaced apart a distance equal to the number of said thrust rollers plus one multiplied by the pitch of said shaft member threading.

12. In a linear actuator of the type including a shaft member; a tubular member in substantial concentric telescoping relation to said shaft member; a bearing unit interposed between said members; a means for rotating one of said members; and means for holding the other member against rotation; with said shaft member being threaded longitudinally thereof to effect linear movement of said tubular member;

the method of operation wherein:
on rotation of said one member, using only rolling friction in said bearing unit to effect said linear movement of said tubular member with respect to said shaft member.

13. The method of operation set forth in claim 12, wherein:
said shaft member in rotating effects linear movement of said tubular member through the bearing unit with an efficiency that approximates 98 percent (98%).

* * * * *